(12) United States Patent
Nasreddine et al.

(10) Patent No.: US 7,291,667 B2
(45) Date of Patent: Nov. 6, 2007

(54) MULTISTAGE PROCESS FOR THE MANUFACTURE OF PEROXIDE-CURED HXNBR-POLYAMIDE THERMOPLASTIC VULCANIZATES

(75) Inventors: Victor Nasreddine, Sarnia (CA); Sharon X. Guo, Sarnia (CA); Rayner Krista, Strathroy (CA); Dirk Achten, Cologne (DE)

(73) Assignee: Lanxess Inc., Sarnia, Ontario (CA)

( * ) Notice: Subject to any disclaimer, the term of this patent is extended or adjusted under 35 U.S.C. 154(b) by 81 days.

(21) Appl. No.: 11/010,733

(22) Filed: Dec. 13, 2004

(65) Prior Publication Data

US 2006/0128894 A1   Jun. 15, 2006

(30) Foreign Application Priority Data

Dec. 10, 2004   (CA) .................................... 2490046

(51) Int. Cl.
*C08L 77/00* (2006.01)
*C08L 9/02* (2006.01)

(52) U.S. Cl. ........................ 524/514; 525/179; 525/183

(58) Field of Classification Search ................ 525/183, 525/179; 524/514
See application file for complete search history.

(56) References Cited

U.S. PATENT DOCUMENTS

| 4,508,867 A | 4/1985 | Sato ........................... 524/434 |
| 5,719,223 A * | 2/1998 | Karg .......................... 524/445 |
| 2003/0134979 A1 | 7/2003 | Ferrari et al. ............... 525/178 |

FOREIGN PATENT DOCUMENTS

| EP | 364 859 | 10/1989 |
| JP | 9-227753 | 2/1997 |

* cited by examiner

*Primary Examiner*—Ana Woodward
(74) *Attorney, Agent, or Firm*—Jennifer R. Seng

(57) ABSTRACT

The present invention relates to a multistage process including at least two steps for making a heat and oil resistant preroxide-cured thermoplastic vulcanizates (TPV) based on hydrogenated carboxiated nitrile butadiene rubber (HX-NBR) and at least one polyamide. TPV's according to the present invention have improved properties and morphology over known TPV's prepared in single-stage processes.

14 Claims, 2 Drawing Sheets

(a) Example 1

(b) Example 2

(c) Comp. 1

(d) Comp. 2

MULTISTAGE PROCESS FOR THE MANUFACTURE OF PEROXIDE-CURED HXNBR-POLYAMIDE THERMOPLASTIC VULCANIZATES

FIELD OF THE INVENTION

The present invention relates to a multistage process including at least two steps for preparing a heat and oil resistant peroxide-cured thermoplastic vulcanizate (TPV) based on hydrogenated carboxylated nitrile butadiene rubber (HXNBR) and polyamides. TPV prepared according to the present inventive multistage process has improved morphology and smaller rubber particle size compared to similar TPV's prepared in single step processes. TPV prepared according to the present invention is readily formable by molding or extrusion, is recyclable, and displays excellent heat and oil-resistant properties that render it suitable for many industrial and automotive under-the-hood applications.

BACKGROUND OF THE INVENTION

TPV's are two-phase systems wherein cured rubber particles are finely dispersed in a thermoplastic phase. The mixing temperature must be high enough to melt the thermoplastic and also cure the rubber. The curing of the rubber phase occurs under conditions of dynamic vulcanization (curing the rubber during melt mixing), contrary to static curing that typically occurs in a rubber mold. Shearing must continue to be applied to prevent the agglomeration of the rubber particles since small rubber particle size is critical in obtaining a product with high performance. For TPV's to have good performance the following properties are desired: (a) the surface energies of the two phases must match, (b) the molecular weight between inter-chain entanglements in the rubber must be low, (c) thermoplastic should have crystallinity, (d) the rubber should be cured at the mixing temperature, and (e) both phases must be stable at the mixing the temperature.

TPV's are processed by techniques commonly used in the plastics industry such as injection molding which makes their fabrication more efficient and cost-effective than thermosets. TPV's have non-Newtonian flow properties and their viscosity is very shear dependent. At low shear rates, their viscosity increases, flow diminishes, and they have a high retention of melt integrity and shape retention when cooled. As the shear rate increases, they become more fluid and can be more rapidly injected into a mould.

Thermoplastic elastomers find many applications, for example in coatings, adhesives and in molded and extruded parts. The latter are valued for their toughness and impact resistance, and find application in automotive parts, mechanical parts, electrical parts and other uses. Specific applications include: seals, wire covers, fuel lines and hoses, cold-air intake tubes, and CVJ boots, pedals, grips, wipers, pipe seals, electrical moldings, as well as injection molded housing and cabinetry for electronic applications.

Improvements in properties are being constantly sought, and often for this purpose polymeric materials are mixed or blended. EP-A1-0 364 859 relates to vulcanizable rubbery compositions containing a polyamide, a partially hydrogenated nitrile rubber and curatives in the nitrile rubber. The partially hydrogenated nitrile rubber, admixed with a curing agent, was gradually added to molten polyamide, with mixing. It is stated that it is preferred to use a polyamide having a low melting point, such as nylon 12. In a preferred embodiment the composition includes maleic anhydride or succinic anhydride. The specification states that the anhydride additive improves mixing between the nylon and the rubber compound. Better results are obtained in an example in which maleic anhydride is used, but the properties of the product obtained are not particularly good, and are not adequate for commercial use.

U.S. Pat. No. 4,508,867 relates to vulcanizable rubbery compositions containing a crystalline polyamide, a synthetic rubbery polymer composed of acrylonitrile or methacrylonitrile, an $\alpha,\beta$-unsaturated carboxylic acid and butadiene, an additive selected from the halides of lithium, magnesium, calcium and zinc, an additive selected from the oxides and hydroxides of magnesium, calcium, barium and zinc and the peroxides of calcium and zinc and further contains sulfur vulcanization active agents. Nylon 11 is the only polyamide whose use is exemplified.

The descriptive portion of the specification suggests that the mixing of the polyamide and the synthetic rubbery polymer should take place at a temperature in the range of from about 50 to about 125° C. In Examples 1 and 2 mixing of nylon 11 and carboxylated nitrile rubber, and other ingredients, took place at 50° C. In Example 3 mixing took place at 190 to 199° C. and Example 4 does not specify the temperature of mixing. It is believed that the compositions of U.S. Pat. No. 4,508,867 do not display adequate heat resistant properties.

WO 03/020820A1 describes the preparation of heat and oil resistant polymers blends of polyamides and hydrogenated carboxylated nitrile rubber prepared according to a single step process. HNBR-Polyamide TPV's prepared according to WO 03/020820 A1 do not yield the morphology and rubber particle size of the TPV's prepared according to the present invention.

SUMMARY OF THE INVENTION

The present invention relates to a multistage process including at least two steps for making a heat and oil resistant peroxide-cured thermoplastic vulcanizate (TPV) based on hydrogenated carboxylated nitrile butadiene rubber (HXNBR) and Polyamides.

Accordingly, the present invention provides a multistage process including at least two steps for preparing a heat and oil resistant peroxide-cured thermoplastic vulcanizate (TPV) based on hydrogenated carboxylated nitrile butadiene rubber (HXNBR) and polyamides. The multistage process according to the present invention involves two or more stages. The first stage of the present invention includes intimately mixing HXNBR and polyamide so that the in-situ compatibilization between carboxylic groups in HXNBR and amine groups in polyamide results in a lower interfacial tension and better mixing. The second stage according to the present invention includes dynamically vulcanizing the HXNBR/polyamide mixture with a peroxide so that the rubber particles are cured during melt mixing resulting in a TPV of tightly cured HXNBR particles finely dispersed in a polyamide matrix. The result is a TPV with smaller rubber particles, finer dispersion, and better morphology than a similar TPV mixed in a single mixing process.

The process according to the present invention provides improved morphology, in part, due to the multistage mixing process which allows for a better dispersion of the peroxide and better control of the curing and mixing rates compared to single step mixing procedures.

In addition, the process according to the present invention can be performed in three stages. The first stage includes preparing a masterbatch of rubber, stabilizers, fillers, plasticizers, and other needed additives. The second stage including intimately mixing of the masterbatch from stage one with a polyamide. The third including dynamically vulcanizing of the blend from stage two to obtain a TPV composed of cured HXNBR particles dispersed in a polyamide matrix.

The present invention also provides a peroxide-cured TPV based on HNBR/Polyamide wherein the HXNBR is blended with HNBR or used as a compatibilizer between the HNBR and the polyamide. Moreover, HXNBR can also be used as a compatibilizer for other rubber-polyamide TPV's.

DESCRIPTION OF PREFERRED EMBODIMENTS

Figure 1A:
FIGS. 1A and 1B illustrate the Transmission Electron Microscopy (TEM) Images of TPV's prepared according to the present invention, wherein the light color is the rubber, the dark color is the polyamide, colors between light and dark correspond to interface regions, and the black spots correspond to the filler or the carrier of the peroxide.

Polyamides useful in the present invention include homopolymers and copolymers that have repeated amide linkages along a polymer chain. The polyamides are preferably of high molecular weight and are crystalline or glossy polymers. Examples include polycaprolactam (nylon 6), polylaurolactam (nylon 12), polyhexamethyleneadipamide (nylon 6,6), polyhexamethyleneazelamide (nylon 6,9), polyhexamethylenesebacamide (nylon 6,10), polyhexamethyleneisophthalamide (nylon 6,IP), polyaminoundecanoic acid (nylon 11), polytetramethyleneadipamide (nylon 4,6) and copolymers of caprolactam, hexamethylenediamine and adipic acid (nylon 6,66), and also aramids such as polyparaphenyleneterephthalamide. The majority of the polyamides have softening points and melting points in the range of from 160 to 250° C.

Hydrogenated carboxylated nitrile rubbers (HXNBR) useful in the present invention and processes for making them are not known in the art and are the subject of our co-pending Canadian Patent Application 2,304,501 the disclosure of which is incorporated by reference for the purpose of Jurisdictions allowing for this feature. Such rubbers are formed by copolymerizing at least diene monomer, preferably a conjugated diene, at least one nitrile monomer, at least one unsaturated acid monomer and optionally further copolymerizable monomers, to form a copolymer with a random, or statistical, distribution of repeating units derived from the diene, nitrile, acid and optionally further co-monomers, followed by hydrogenation. When the, preferably conjugated, diene is polymerized the product contains some carbon-carbon double bonds. In the past attempts to hydrogenate those carbon-carbon double bonds have led also to reduction of nitrile and carboxyl groups, which is undesirable. CA-Application 2,304,501 enables hydrogenation of carbon-carbon double bonds of carboxylated nitrile rubber without concomitant reduction of nitrile and carboxyl groups, yielding novel and valuable polymers. These are nowadays commercially available from Lanxess Deutschland GmbH under the trademark Therban XT.

Many, preferably conjugated, dienes can be used in the hydrogenated carboxylated nitrile rubber. Mention is made of 1,3-butadiene, isoprene, 2,3-dimethyl-1,3-butadiene, 1,3-pentadiene and piperylene, of which 1,3-butadiene is preferred.

The nitrile monomer is normally acrylonitrile, methacrylonitrile or alpha-chloroacrylonitrile, of which acrylonitrile is preferred.

The unsaturated acid is preferably alpha,beta-unsaturated, and can be, for example, acrylic, methacrylic, ethacrylic, crotonic, maleic (possibly in the form of its anhydride), fumaric or itaconic acid, of which acrylic and methacrylic are preferred.

The conjugated diene usually constitutes in the range of from 50 to 85% of the polymer, the nitrile usually constitutes in the range of from 15 to 50% of the polymer and the acid in the range of from 0.1 to 10%, preferably 0.5 to 7%, these percentages being by weight. The polymer may also contain an amount, usually not exceeding 10 wt. %, of another copolymerizable monomer, for example, an ester of an unsaturated acid, say ethyl, propyl or butyl acrylate or methacrylate, or a vinyl compound, for example, styrene, alpha-methylstyrene or a corresponding compound bearing an alkyl substituent on the phenyl ring, for instance, a p-alkylstyrene such as p-methylstyrene. It is trivial that the values of the repeating units given above will have to be adjusted accordingly to result in a total of 100 wt. %. The polymer preferably is a solid that has a molecular weight in excess of 60,000, most preferably in excess of 100,000 g/mol.

The degree of hydrogenation can be expressed in terms of residual double bonds (RDB), being the number of carbon-carbon double bonds remaining after hydrogenation, expressed as a percentage of the carbon-carbon double bonds prior to hydrogenation. HXNBR's with RDB less than 6 are preferred and HXNBR's with RDB in the range from 0.9 to 5.5 are particularly preferred. Preferred acrylonitrile contents are 32%, 33%, 34%, 36%, 39% and 43% (all by weight).

Preferably, according to the present inventive multistage process, the first stage involves mixing a polyamide with HXNBR under high shear with the needed additives. Suitable mixing temperature can range from 100° C. to 300° C., preferably from 150 to 240° C., depending upon the polyamide grade. In a second stage according to the present invention, the curative is added to perform dynamic vulcanization and cure the rubber particles under conditions of high shear. It is important that the curative used be added at temperatures where it can be incorporated in such a manner that the curing and mixing rates are controlled. Preferably the curative is added at a temperature below the melting point of the polyamide incorporated in step 1, more preferably at a temperature in the range of between 150 to 240° C., most preferably between 180 to 220° C. After curative addition and dispersion, mixing conditions are adjusted to cause a quick temperature increase to achieve dynamic vulcanization. This necessitates the careful selection of the peroxide and the control of the mixing temperatures and shear conditions.

Also according to the present invention, the process can be performed in three stages. The first stage includes preparing a masterbatch of rubber, stabilizers, fillers, plasticizers, and other needed additives. The second stage including intimately mixing of the masterbatch from stage one with a polyamide. The third including dynamically vulcanizing of the blend from stage two to obtain a TPV composed of cured HXNBR particles dispersed in a polyamide matrix.

An antioxidant may be used in the mixing process according to the present invention. Examples of suitable antioxidants include p-dicumyl diphenylamine (Naugard® 445), Vulkanox® DDA (a diphenylamine derivative), Vulkanox® ZMB2 (zinc salt of methylmercapto benzimidazole), Vulkanox® HS (polymerized 1,2-dihydro-2,2,4-trimethyl quinoline) and Irganox® 1035 (thiodiethylene bis(3,5-di-tert.-butyl-4-hydroxy) hydrocinnamate or thiodiethylene bis (3-(3,5-di-tert.-butyl-4-hydroxyphenyl)propionate supplied by Ciba-Geigy.

Suitable peroxide curatives useful in the present invention include dicumyl peroxide, di-tert.-butyl peroxide, benzoyl peroxide, 2,2'-bis (tert.-butylperoxy diisopropylbenzene (Vulcup® 40KE), benzoyl peroxide, 2,5-dimethyl-2,5-di(tert-butylperoxy)-hexyne-3,2,5-dimethyl-2,5-di(benzoylperoxy)hexane, (2,5-bis(tert.-butylperoxy)-2,5-dimethyl hexane and the like can be used. The high temperature of the polyamide melt influences the selection, however. The best suited curing agents are readily accessible by means of few preliminary experiments. A preferred peroxide curing agent is commercially available under the trademark Vulcup® 40KE. The peroxide curing agent is suitably used in an amount of 0.2 to 7 parts per hundred parts of rubber (phr), preferably 1 to 3 phr. Too much peroxide may lead to undesirably violent reaction. Sulphur, sulphur-containing compounds and resins can also be used as curatives.

Vulcanizing co-agents can also be used. Mention is made of triallyl isocyanurate (TAIC), commercially available under the trademark DIAK 7 from DuPont Or N,N'-m-phenylene dimaleimide know as HVA-2 (DuPont Dow), triallyl cyanurate (TAC) or liquid polybutadiene known as Ricon D 153 (supplied by Ricon Resins). Amounts can be equivalent to the peroxide curative or less, preferably equal.

Crosslinking density can further be increased by the addition of an activator such as zinc peroxide (50% on an inert carrier) using Struktol ZP 1014 in combination with the peroxide. Amounts can be between 0.2 to 7 phr, preferably 1 to 3 phr.

It is possible to achieve further crosslinking by using curatives used with carboxylated polymers such as: amines, epoxies, isocyanates, carbodiimides, aziridines, or any other additive that can form a derivative of a carboxyl group.

The ratio of polyamide to hydrogenated carboxylated nitrile rubber can vary between wide limits, preferably from 90 parts to 10 parts by weight to 10 parts to 90 parts by weight. Properties of the conjugate vary, depending on the ratio of polyamide to elastomer. The ratio can of course be varied to optimize particular properties, and tests of TPV's of different proportion can be carried out routinely by persons skilled in the art.

It is possible to include processing oils and extenders or plasticizers in the TPV according to the present invention. Suitable plasticizers include those well known for use with nitrile polymers such as the phthalate compounds, the phosphate compounds, the adipate compounds, the alkyl carbitol formal compounds, the coumarone-indene resins and the like. An example is the plasticizer commercially available under the trademark Plasthall 810, or Plasthall TOTM (trioctyl trimellitate) or TP-95 (di-(butoxy-ethoxy-ethyl) adipate supplied by Morton International. The plasticizer should be a material that is stable at high temperature and will not exude from the conjugate. If plasticizer is to be used it is preferred to melt the polyamide, add a first portion of the hydrogenated carboxylated nitrile rubber, say about half, mix, then add the plasticizer, mix and then add the remainder of the HXNBR and continue mixing. The amount of plasticizer used will depend upon the proposed end use of the conjugate, but may be between 1 and 40 phr, preferably between 5 and 20 phr. It is further possible to use a blend of polyamides. It is also possible to use a mixture of HXNBR's or a mixture of the HXNBR and another elastomer, for example a carboxylated nitrile rubber (XNBR), a hydrogenated nitrile rubber (HNBR) or a nitrile rubber (NBR), a vinyl acetate rubber (EVM) or a ethylene/acrylate rubber (AEM). Suitable XNBR's are commercially available from Lanxess Deutschland GmbH under the trademark Krynac and suitable HNBR's are commercially available from Lanxess Deutschland GmbH under the trademark Therban and suitable NBR's are available from Lanxess Deutschland GmbH under the trademark Perbunan. EVM is commercially available from Lanxess Deutschland GmbH under the trademark Levapren. Vamac® D an ethylene acrylic elastomer is commercially available from DuPont.

The present inventive TPV can also comprise at least one filler. The filler may be an active or inactive filler or a mixture thereof. The filler may be in particular:

highly dispersed silicas, prepared e.g. by the precipitation of silicate solutions or the flame hydrolysis of silicon halides, with specific surface areas of in the range of from 5 to 1000 m2/g, and with primary particle sizes of in the range of from 10 to 400 nm; the silicas can optionally also be present as mixed oxides with other metal oxides such as those of Al, Mg, Ca, Ba, Zn, Zr and Ti;

synthetic silicates, such as aluminum silicate and alkaline earth metal silicate like magnesium silicate or calcium silicate, with BET specific surface areas in the range of from 20 to 400 m2/g and primary particle diameters in the range of from 10 to 400 nm;

natural silicates, such as kaolin and other naturally occurring silica;

glass fibers and glass fiber products (matting, extrudates) or glass microspheres;

carbon blacks; the carbon blacks to be used here are prepared by the lamp black, furnace black or gas black process and have preferably BET (DIN 66 131) specific surface areas in the range of from 20 to 200 m2/g, e.g. SAF, ISAF, HAF, FEF or GPF carbon blacks;

rubber gels, especially those based on polybutadiene, butadiene/styrene copolymers, butadiene/acrylonitrile copolymers and polychloroprene;

or mixtures thereof.

Examples of preferred mineral fillers include silica, silicates, clay such as bentonite, gypsum, alumina, titanium dioxide, talc, mixtures of these, and the like. These mineral particles have hydroxyl groups on their surface, rendering them hydrophilic and oleophobic. This exacerbates the difficulty of achieving good interaction between the filler particles and the rubber. For many purposes, the preferred mineral is silica, especially silica made by carbon dioxide precipitation of sodium silicate. Dried amorphous silica particles suitable for use in accordance with the invention may have a mean agglomerate particle size in the range of from 1 to 100 microns, preferably between 10 and 50 microns and most preferably between 10 and 25 microns. It is preferred that less than 10 percent by volume of the agglomerate particles are below 5 microns or over 50 microns in size. A suitable amorphous dried silica moreover usually has a BET surface area, measured in accordance with DIN (Deutsche Industrie Norm) 66131, of in the range of from 50 and 450 square meters per gram and a DBP absorption, as measured in accordance with DIN 53601, of in the range of from 150 and 400 grams per 100 grams of silica, and a drying loss, as measured according to DIN ISO 787/11, of in the range of from 0 to 10 percent by weight. Suitable silica fillers are available under the trademarks HiSil® 210, HiSil® 233 and HiSil® 243 from PPG Industries Inc. Also suitable are Vulkasil® S and Vulkasil® N, from Lanxess AG.

The TPV according to the present invention can contain further auxiliary products for rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts, which depend inter alia on the intended use. Conventional amounts are e.g. from 0.1 to 50 wt. %, based on rubber. Preferably the TPV contains in the range of 0.1 to 20 phr of an organic fatty acid as an auxiliary product, preferably a unsaturated fatty acid having one, two or more carbon double bonds in the molecule which more preferably includes 10% by weight or more of a conjugated diene acid having at least one conjugated carbon-carbon double bond in its molecule. Preferably those fatty acids have in the range of from 8-22 carbon atoms, more preferably 12-18. Examples include stearic acid, palmitic acid and oleic acid and their calcium-, zinc-, magnesium-, potassium- and ammonium salts. Preferably the TPV includes in the range of 5 to 50 phr of an acrylate as an auxiliary product. Suitable acrylates are known from EP-A1-0 319 320, U.S. Pat. Nos. 5,208,294 and 4,983,678. Reference is made to zinc acrylate, zinc diacrylate or zinc dimethacrylate or a liquid acrylate, such as trimethylolpropanetrimethacrylate (TRIM), butanedioldimethacrylate (BDMA) and ethylenglycoldimethacrylate (EDMA). It might be advantageous to use a combination of different acrylates and/or metal salts thereof. Of particular advantage is often to use metal acrylates in combination with a Scorch-retarder such as sterically hindered phenols (e.g. methyl-substituted aminoalkylphenols, in particular 2,6-di-tert.-butyl-4-dimethylaminomethylphenol). It is possible to incorporate other known additives or compounding agents in the TPV according to the present invention.

The TPV of the present invention can be formed into free flowing pellets, remelted and resolidified without any significant deterioration or deleterious effect on its properties. In this respect, it differs from elastomers such as pure HXNBR, XNBR, HNBR and the like; after crosslinking these cannot be melted and resolidified. The TPV of the present invention is also recyclable.

EXAMPLES

General Procedure

A Brabender Plasticorder was fitted with roller mixing blades and a 369 g capacity bowl. Mixer bowl temperature, fill factor, mixing time and roller speed were varied. In the first stage of the multipstep mixing procedure the rubber and additives used were mixed with melted nylon. In a second step, the peroxide was added and dynamic vulcanization occurs. The compound was then passed through a 70° C. mill once to make a flat sheet. A Preco Press was used to compression mould test pieces. The compound was added to a pre-heated mould and placed in the press at 0 psi at 240° C. for 10 minutes. The mould was then held at 20,000 psi for 20 minutes, after which the molded sample was transferred to a cold press and held at 10,000 psi for 5 min.

The polyamide used was Durethan® C 38 F (mp 210° C.) polyamide 6, supplied by Bayer AG. The HXNBR used a Therban® XT that has carboxyl moieties, based on methacrylic acid, of approximately 5.0%, an acrylonitrile content of 33%, the balance 1,3-butadiene, a Mooney viscosity of 77 and an RDB of 3.5%. The HNBR used in this example is Therban® A3907 with an acrylonitrile content of 39% and an RDB % not greater than 0.9.

Example 1

In the first step, 70 phr rubber Therban® XT and 30 phr of polyamide 6 (Durethan®) C 38 F) were blended in the presence of antioxidant Naugard® 445, process aids Armeen 18D and Vanfre Vam, plasticizer Plasthall TOTM and Carbon Black N762. The nylon was melted and the mixture was very well mixed. In the second stage the peroxide, namely 3.5 phr of Vulcup 40KE and 2.2 phr Struktol ZP 1014 were added in a temperature range of between 150-220° C. to the blend prepared from stage 1 and dynamic vulcanization was achieved under high shear conditions. 1 phr of antioxidant Irganox 1035 (thiodiethylene bis(3,5-di-t-butyl-4-hydroxy) hydrocinnamate or thiodiethylene bis(3-(3,5-di-t-butyl-4-hydroxyphenyl)propionate supplied by Ciba-Geigy was added before the mixing was stopped. The final temperatures in both stages were around 240° C.

The Brabender mixing conditions for the two stages were as follows: 75% fill factor; 95 RPM mixing blade speed; the temperature range was 150-240° C.; 20 minutes total mixing time (stage 1+2). Tables 1 and 2 show the formulations and stress-strain data of the TPV's.

Example 2

Was prepared according to Example 1 except 35 phr Therban® XT and 35 phr Therban® A3907 were used instead of 70 phr Therban® XT.

Comparative Example 1

The formulation of the TPV prepared according to Example 2 was used but mixing was done in a single stage process. The Brabender mixing conditions were as follows: 75% fill factor; 95 RPM mixing blade speed; the temperature range was 210-220° C.; 20 minutes total mixing time. 70 phr rubber Therban® XT and 30 phr of polyamide 6 (Durethan® C 38 F) were blended in the presence of antioxidant Naugard® 445, process aids Armeen 18D and Vanfre Vam, plasticizer Plasthall TOTM and Carbon Black N762. Vulcup 40KE and Struktol ZP 1014 were added in a temperature range of 180-220° C. Irganox 1035 was added before the mix was stopped. The total mixing time was 20 minutes.

Comparative Example 2

The TPV was prepared in a single stage process according to WO 03/020820A1. Durethan® C 38 F was melted first at 240° C. then Therban® XT and Naugard 445 were added. After mixing for 3-5 minutes, the Vulcup 40KE and Struktol ZP1014 were added at a temperature above 225° C. Irganox 1035 was added 1 minute before the end and the total mixing time was 8-10 minutes.

TABLE 1

Formulation of the HXNBR/HNBR-Polyamide TPV

| | Example 1 | Example 2 | Comp. 1 | Comp. 2 |
|---|---|---|---|---|
| Therban XT 8889 | 70 | 35 | 35 | 70 |
| Therban A3907 | — | 35 | 35 | — |
| Durethan ® C 38 F | 30 | 30 | 30 | — |
| Durethan ® B 31SK | — | — | — | 30 |
| Vanfre Vam | 1 | 1 | 1 | — |
| Armeen 18D | 0.5 | 0.5 | 0.5 | — |
| Naugard 445 | 1 | 1 | 1 | 0.7 |
| Carbon Black, N 762 | 10 | 10 | 10 | — |
| Plasthall TOTM | 10 | 10 | 10 | — |
| Diak # 7 | — | — | — | 2.2 |
| Struktol ZP 1014 | 2.2 | 2.2 | 2.2 | — |
| Vulcup 40KE | 3.5 | 3.5 | 3.5 | 2.2 |
| Irganox 1035 | 1 | 1 | 1 | 0.15 |

Therban ™ XT ™ 8889 is HXNBR and Therban™ A3907 is HNBR from Lanxess Deutschland GmbH.
Durethan ® C 38 F is a polyamide from Lanxess Deutschland GmbH.
Durethan ® B31 SK is a polyamide from Lanxess Deutschland GmbH.
Vanfre Vam™ is a phosphate process aid from R. T. Vanderbilt.
Armeen ™ 18D is an octadecylamine available from AkzoNobel and is used to reduce compound stickiness to metal.
Naugard ™ 445 (p-dicumyl diphenyl amine) is a stabilizer from Uniroyal.
Carbon Black N672 from Cabot.
Plasthall TOTM ™ (Trioctyl Trimellitate) is a plasticizer from C. P. Hall.
DIAK # 7 (Triallyl Isocyanurate) is a co-agent DuPont Dow Elastomers.
Struktol ™ ZP 1014 (Zinc Peroxide 50% on inert carrier).
Vulcup 40 KE (α,β-bis(t-butylperoxy)diisopropylbenzene), 40% peroxide.
Irganox 1035 is a stabilizer (thiodiethylene bis(3,5-di-t-butyl-4-hydroxy) hydrocinnamate.

TABLE 2

Stress-strain and Aging data

| | Example 1 | Example 2 | Comp. 1 | Comp. 2 |
|---|---|---|---|---|
| Stress-Strain | | | | |
| Hardness (Shore A)* | 72 | 72 | 61 | 73 |
| Elongation @ Break (%)** | 15 | 12 | 10 | 9.3 |
| Ultimate Tensile (MPA)** | 310 | 317 | 247 | 220 |
| Tensile Set @ Break (%)** | 31 | 30 | 27 | 33 |
| Fluid Aging IRM903 (70 hours @ 150° C.) | | | | |
| Volume Change % | 4 | 4 | 4 | 18 |

*ASTM D2240
**ASTM D412

Figure 1B:
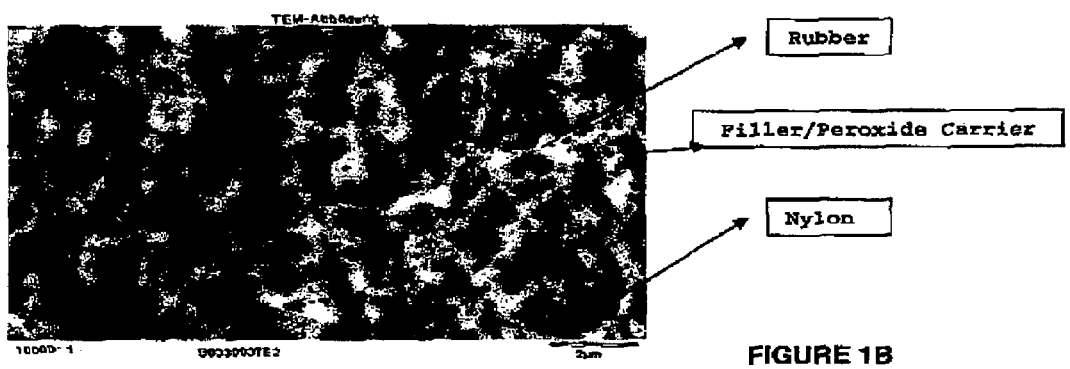
Figure 2A:
FIGS. 2A and 2B illustrate the Transmission Electron Microscopy (TEM) images of comparative TPV's, wherein the light color the rubber, the dark color is the polyamide, colors between light and dark correspond to interface regions, and the black spots correspond to the filler or the carrier of the peroxide.
Figure 2B:
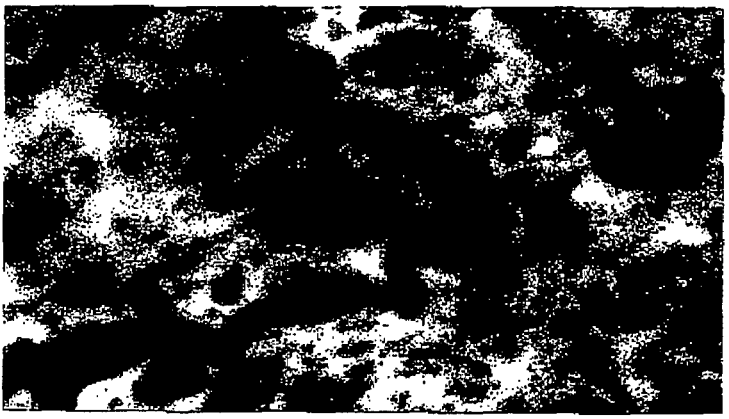

The TEM's of the compounds discussed in Table 1 are shown in FIGS. 1 and 2. The light color is the rubber, dark color is the polyamide, colors between light and dark correspond to interface regions, and the black spots correspond to the filler or the carrier of the peroxide. The TEMs illustrate that Examples 1 (Therban XT only) and 2 (Therban® XT/Therban® A3907) which are prepared in a multistage process according to the present invention have better morphology and dispersion of rubber particles than Comp. 1 which was mixed for the same period but in a single stage. Examples 1 and 2 also have a better morphology and smaller rubber particle size when compared to Comp. 2 (TEM scale is 5 microns) from WO 03/020820A1 which is also prepared in a single stage mixing procedure. Although Comp. 1 and 2 have some small rubber particles, they have fewer small particles than Examples 1 and 2.

The improved morphology of the present inventive multistage mixing process lies in the preparation of an uncured rubber-plastic blend in one stage followed by a second stage where the curative is added is a certain temperature range that allows for a better control of mixing conditions (curing and mixing rates) to achieve the improved morphology. It is evident that the multistage mixing procedure of the this invention yields better morphology, finer dispersion, and a larger number of smaller rubber particles compared to compounds prepared in a single mixing process. This better morphology displayed by Examples 1 and 2 is demonstrated in their higher tensile strength and higher Eb, since it is known to those skilled in the art that smaller rubber particle size and finer dispersion leads to improved mechanical properties.

Although the invention has been described in detail in the forgoing for the purpose of illustration, it is to be understood that such detail is solely for the purposed and that variations can be made therein by those skilled in the art without departing from the spirit and scope of the invention except as it may be limited by the claims.

What is claimed:

1. A multistage process comprising at least two steps for preparing a heat and oil resistant cured thermoplastic vulcanizate based on a rubber and a polyamide,
    wherein the process comprises:
    a. mixing the rubber and polyamide at a temperature in the range from 100 to 300° C., then
    b. vulcanizing the rubber/polyamide mixture in the presence of a curative, wherein the curative is added at a temperature below the melting point of the polyamide incorporated in step a.

2. A process according to claim 1, wherein the polyamide is selected from the group consisting of:
    polyeaprolactam;
    polylaurolactam;
    polyhexamethyleneadipamide;
    polyhexamethyleneazelamide;
    polyhexamethylenesebacamide;
    polyhexamethyleneisophthalamide;
    polyaminoundecanoic acid;
    polytetramethyleneadipamide;
    copolymers of caprolactam, hexamethylenediamine and adipic acid;
    aramids; and
    mixtures thereof.

3. A process according to claim 1, wherein the rubber is a hydrogenated carboxylated nitrile rubber.

4. A process according to claim 3, wherein the hydrogenated carboxylated nitrile rubber is a copolymer of acrylonitrile, butadiene and acrylic acid, having a residual carbon-carbon double bond content of 6% or less.

5. A process according to claim 1, wherein the rubber is a blend of a hydrogenated carboxylated nitrile rubber (HXNBR) and a hydrogenated nitrile rubber (HNBR).

6. A process according to claim 1, wherein the rubber is a blend of hydrogenated carboxylated nitrile rubber (HXNBR) and an elastomer selected from carboxylated nitrile rubber (XNBR), nitrile rubber (NBR), vinyl acetate rubber (EVM), or ethylene/acrylate rubber (AEM).

7. A process according to claim 1, wherein the curative is a peroxide.

8. A process according to claim 7, wherein the peroxide is selected from dicumyl peroxide, di-tert.-butyl peroxide, benzoyl peroxide, 2,2'-bis(tert.-butylperoxy diisopropylbenzene (Vulcup® 40KE), benzoyl peroxide, 2,5-dimethyl-2,5-di(tert-butylperoxy)-hexyne-3,2,5-dimethyl-2,5- -di(benzoylperoxy)hexane, (2,5-bis(tert.-butylperoxy)-2,5-dimethyl hexane or mixtures thereof.

9. A process according to claim 1, wherein the curing agent comprises zinc peroxide.

10. A process according to claim 1, wherein the multistage process is performed in an extruder or internal mixer.

11. A process according to claim 1, further comprising the step of forming the thermoplastic vulcanizate (TPV) into free flowing pellets.

12. A thermoplastic vulcanizate (TPV) prepared according to claim 1.

13. A thermoplastic vulcanizate (TPV) according to claim 12 in the form of a molded or an extruder part.

14. A multistage process comprising at least three steps for preparing a heat and oil resistant cured thermoplastic vulcanizate based on a rubber and a polyamide, wherein the process comprises:

a. mixing the rubber, at least one plasticizer and at least one filler to form a rubber masterbatch; then b. mixing the rubber masterbatch and a polyamide at a temperature in the range from 100 to 300° C., then c. vulcanizing the rubber/polyamide mixture in the presence of a curative, wherein the curative is added at a temperature below the melting point of the polyamide incorporated in step b.

* * * * *